United States Patent [19]
van Alem et al.

[11] Patent Number: 4,796,245
[45] Date of Patent: Jan. 3, 1989

[54] OPTICAL DISC READER HAVING LENS MOUNTING WITH IMPROVED POSITIONING CONTROL

[75] Inventors: Antonius A. M. van Alem; Gerard E. van Rosmalen, both of Eindhoven, Netherlands

[73] Assignee: U.S. Philips Corporation, New York, N.Y.

[21] Appl. No.: 186,644

[22] Filed: Apr. 13, 1988

Related U.S. Application Data

[63] Continuation of Ser. No. 868,999, Nov. 23, 1984, abandoned.

[30] Foreign Application Priority Data

Dec. 1, 1983 [NL] Netherlands .......................... 8304141

[51] Int. Cl.⁴ .............................................. G11B 7/00
[52] U.S. Cl. ......................................... 369/44; 369/45
[58] Field of Search ................. 358/342; 250/201 DF; 369/43–47; 350/247, 255

[56] References Cited

U.S. PATENT DOCUMENTS

| | | | |
|---|---|---|---|
| 4,073,567 | 2/1978 | Lakerveld et al. | 350/6.5 |
| 4,367,543 | 1/1983 | Araki | 369/45 |
| 4,389,101 | 9/1983 | van Rosmalen | 350/486 |
| 4,403,316 | 9/1983 | van de Veerdonk | 369/44 |
| 4,592,037 | 5/1986 | Ohnuki | 350/255 X |
| 4,660,190 | 4/1987 | Fujii et al. | 369/45 X |
| 4,664,476 | 5/1987 | Kasuga | 350/252 |

FOREIGN PATENT DOCUMENTS

| | | |
|---|---|---|
| 057070 | 8/1982 | European Pat. Off. . |
| 063934 | 11/1982 | European Pat. Off. . |
| 068757 | 1/1983 | European Pat. Off. . |
| 121857 | 10/1984 | European Pat. Off. . |
| 147853 | 7/1985 | European Pat. Off. . |
| 804696 | 4/1951 | Fed. Rep. of Germany . |
| 2260855 | 4/1983 | Fed. Rep. of Germany . |
| 2097151 | 10/1982 | United Kingdom . |
| 2134665 | 8/1984 | United Kingdom . |

Primary Examiner—Robert L. Richardson
Attorney, Agent, or Firm—F. Brice Faller

[57] ABSTRACT

An electro-optical device is able to follow the information structure (2) of a moving information carrier (3) with a radiation spot 17 in two directions, of which one extends in a plane perpendicular to the other. A lens system (5) is fixed in a lens mounting (9) which relative to a frame (4) may perform pivotal movements about a pivotal axis (10) parallel to the optical axis (6) of the lens system and translational movements along the pivotal axis (10) by means of electromagnetic actuator means (14, 13) which are symmetrically located with respect to the pivotal axis. The lens mounting (9) is of elongate form and its parts which are situated on opposite sides of the pivotal axis (11) have substantially the same mass and mass distribution.

9 Claims, 2 Drawing Sheets

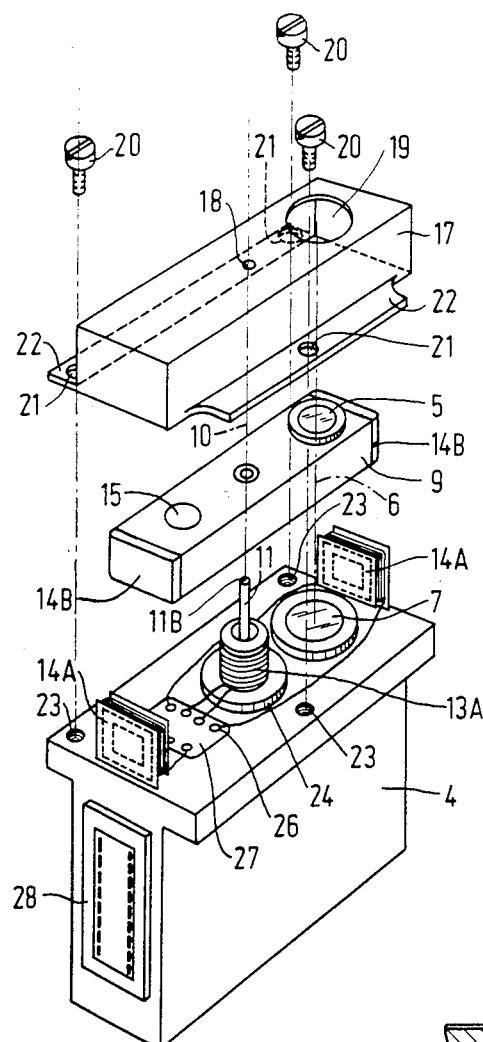
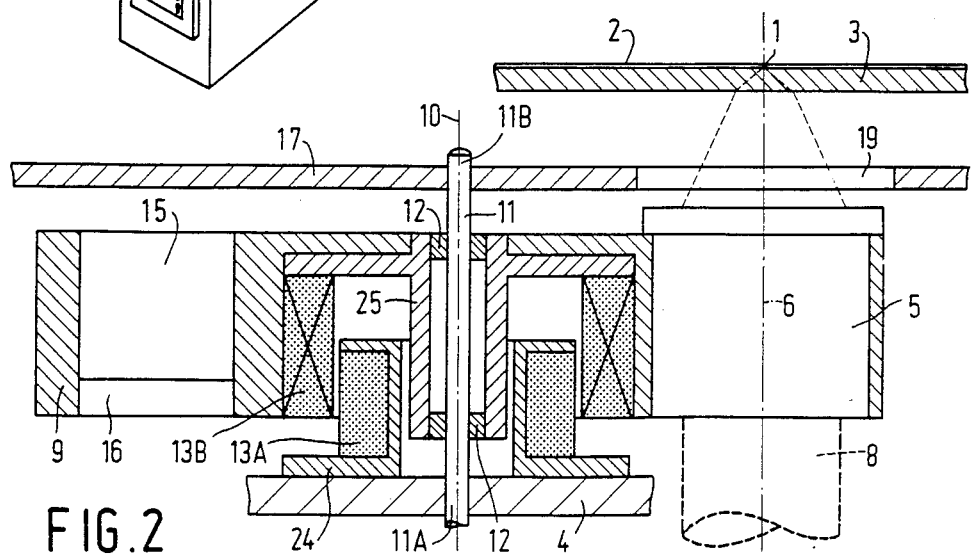
FIG.1
FIG.2

OPTICAL DISC READER HAVING LENS MOUNTING WITH IMPROVED POSITIONING CONTROL

This is a continuation of application Ser. No. 868,999 filed Nov. 23, 1984 and now abandoned.

BACKGROUND OF THE INVENTION

The invention relates to an electro-optical device for the electrodynamic control of the position of a radiation spot in two directions relative to an information structure of a moving information carrier, namely, in a first direction for focusing the radiation spot on the information structure and in a second direction in a plane perpendicular to the first direction for following a track of the information structure.

A lens system is rigidly secured to a lens mounting which is pivotable to a limited extent relative to the frame about a pivotal axis parallel to and spaced from the optical axis and which is also translatable to a limited extent along the pivotal axis. Supporting means which enable movement of the lens mounting to be made include a bearing pin whose axis forms the pivotal axis and at least one bearing in which the bearing pin fits. Electromagnetic first and second actuator means effect translating the lens mounting along and pivoting it about the pivotal axis, respectively.

Such an electro-optical device for use in an optical record player is disclosed in European Patent Application No. 0068757. The lens system is arranged eccentrically in an end wall of a lens mounting comprising the end wall and a cylindrical sleeve adjoining this end wall. A sleeve bearing extends from the end wall in an axial direction and is slidable on the bearing pin. The cylindrical sleeve is axially movable and pivotable about the pivotal axis in an air gap between portions of a stator yoke which forms part of the actuator means. This stator yoke is provided with an annular permanent magnet and the stator cooperates with moving actuator means on the lens mounting. These means comprise a coil wound around the cylindrical sleeve for the axial movements and four rectangular coils which are secured to the cylindrical sleeve by an adhesive and which are bent to match the shape of the cylindrical sleeve for the pivotal movements of the lens mounting.

In general this type of electro-optical device must have a large dynamic bandwidth in order to guarantee a satisfactory control of the position of the radiation spot. A large dynamic bandwidth is also important for another reason. The susceptibility of the device to shocks exerted on it decreases as the dynamic control system is capable of more rapidly eliminating the error in the position of the radiation spot caused by the shock. Particularly, if the electro-optical device is incorporated in, for example, an optical audio record player, used in a vehicle the significance of this second reason will become more apparent. The electro-optical device described is susceptible to external shocks and is slow due to the eccentric position of the lens system and due to the concentration of a substantial part of the mass of the lens mounting in the cylindrical sleeve. Therefore, in order to reduce the effect of external shocks more power is required than is desirable. A low power is desirable in view of the heat dissipated in the coils and the dimensioning of the required control circuitry. Moreover, the known device is of intricate construction.

SUMMARY OF THE INVENTION

The invention is characterized in that the lens mounting is of elongate form with a maximum longitudinal dimension extending along a line which intersects the optical axis of the lens system and the pivotal axis and with a lateral dimension no greater than twice the diameter of the lens system. The two parts of the lens mounting, which are situated on opposite sides of the pivotal axis have the same or approximately the same mass and the same or approximately the same mass distribution. As a result of the elongate form the mass of the lens mounting is minimized. The lateral dimension can be adapted to the diameter of the lens system. Even when it is desired to arrange the lens system in an opening which extends right through the lens mounting, so that the entire circumference of the lens system is surrounded by parts of the lens mounting, it will not be necessary to make the lateral dimension of the lens mounting larger than twice the diameter of the lens system. Since the two parts of the lens mounting which are situated on opposite sides of the pivotal axis have the same or approximately the same mass and the same or approximately the same mass distribution, the lens mounting is substantially balanced both statically and dynamically. As a result of this, the lens mounting is immune to shocks and the supporting means of the lens mounting are not subjected to varying forces during pivotal movements of the lens mounting performed when following the track of the information carrier.

For the sake of completeness it is to be noted that European Patent Application No. 0074131 also describes a device comprising a lens mounting for writing and/or reading recording tracks in an optical disc by means of a radiation spot. The device comprises a pivotal arm and a lens system which is movable relative to the pivotal arm for focussing a radiation beam on the information surface of the optical disc. For this purpose the lens system is suspended from the pivotal arm by means of blade springs. The pivotal arm itself is pivotable about a pivotal axis for radially moving the radiation spot over the entire information surface of the optical disc and for correcting tracking errors.

A disadvantage of this construction are the necessarily large dimensions and the large mass of the pivotal arm, so that the device has a comparatively high inertia. This known device provides satisfactory results when the device is subjected only to small external vibrations. However, if the device is used under conditions in which it is frequently subjected to heavy shocks and vibrations, for example if the device is used in a moving vessel or vehicle, it has been found that the dynamic bandwidth is too low to cancel the resulting deviations in the position of the radiation spot completely. Cancellation of external effects also demands a substantial power as a result of the large dimensions and the large mass of the pivotal arm, which may be a problem if the required power is furnished by a battery, as is the case in a vehicle. Moreover, focussing also demands a substantial amount of power because the blade springs in the known device have to be deformed continually.

The device in accordance with the present invention does not have these drawbacks because its entirely different construction enables the dimensions and weight of the device to be reduced substantially.

When a first end of the bearing pin, as is the case in the electro-optical device in accordance with European Patent Application No. 0068757 described above, is connected to the frame, an advantageous embodiment of the invention may be used which is characterized in that the bearing pin extends through the lens mounting so that a second end of the bearing pin projects from the mounting. The bearing pin comprises a thin flexible metal wire and the second end of the bearing pin is connected to a support which is secured to the frame, and the position of at least one of the ends of the bearing pin being adjustable in a direction transverse to the pivotal axis. The use of a thin bearing pin has the advantage that frictional torques which are exerted on the bearings and hence on the lens mounting are small since the frictional force act on a small radius. The adjustability of the position of one of the ends of the bearing pin permits a correction for small deviations in the orientation of the optical axis of the lens system relative to other parts of the electro-optical device which are connected to the frame. This embodiment results in an electro-optical device in which a low-cost bearing pin can be used, which can be mounted in a simple and rapid manner, the lens mounting experiencing a minimal friction during pivotal movements. In this respect another embodiment of the invention is of significance which is characterized in that the lens mounting comprises two angular ruby bearings for the bearing pin, which bearings are spaced from each other. Such bearings are commercially available, have a long life, and produce minimal friction.

In view of a minimal power consumption of the electrodynamic control system an embodiment of the invention is of interest which is characterized in that the first actuator means are situated between the ends of the lens mounting near the pivotal axis and the second actuator means are situated near the ends of the lens mounting. The second actuator means exert forces on the ends of the lens mounting so that maximal torques can be exerted with force of a given magnitude. The first actuator means, which exert axial forces on the lens mounting, can be arranged between the ends of the lens mounting so that a compact construction is possible.

A further embodiemnt of the invention has the advantage that a simple coil configuration may be used and is characterized in that the first and the second actuator means respectively comprise first and second permanent-magnetic actuator means on the lens mounting and first and second actuator-coil means on the frame. The first and second permanent-magnetic actuator means are situated at least partly along the circumference of the lens mounting and are axially spaced from one another. The actuator-coil means include a plurality of coaxial coils which are situated around the lens mounting so as to form an air gap, which are axially spaced from each other, and are arranged on a common coil former. The coils may simply be wound on the outer circumference of the common coil former, which is a simple procedure. As will be described hereinafter with reference to the drawings, the coil former may also be used as a cover for the lens mounting.

Another embodiment of the invention, which occupies little space at the ends of the lens mounting and which can operate with only two actuator coils, is characterized in that the first and second actuator means comprise first and second permanent-magnetic actuator means arranged on opposite long sides of the lens mounting parallel to the plane containing the pivotal axis and the optical axis when the lens mounting is in its neutral position. The first permanentmagnetic actuator means on each side of the lens mounting comprise an axially magnetized first permanent magnet whose centre is situated in the plane containing the pivotal axis and extending perpendicularly to the plane containing the optical axis and the pivotal axis. The second permanent-magnetic actuator means on each side of the lens mounting comprise two permanent magnets situated one on each of two opposite sides of the respective first permanent magnet at equal distances therefrom. The magnets of the second permanent-magnetic actuator means are magnetized in the same direction perpendicular to the plane containing the centers of the first permanent magnets and the pivotal axis. The first and second actuator means comprise two combined flat coils secured to the frame, one on each side of the lens mounting parallel to said plane containing the optical axis and the pivotal axis, each first permanent magnet being situated within the projected inner peripherics of the turns of a coils and each second permanent magnet facing turns of a coil which extends at least substantially parallel to the pivotal axis.

FIG. 1 is an exploded perspective view of an electro-optical device in a first embodiment, FIG. 2 is a sectional view of part of the electro-optical device shown in FIG. 1, taken in the longitudinal direction of the lens mounting, FIG. 3 is a perspective view of a part of a second embodiment of the invention, a part of the cover being broken away for the sake of clarity, and FIG. 4 is an exploded view of the lens mounting and actuator means of a third embodiment.

DETAILED DESCRIPTION OF THE PREFERRED EMBODIMENT

Figure 3:
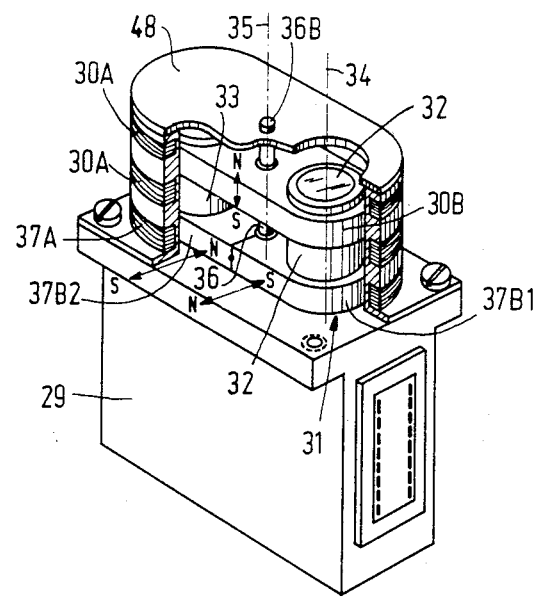

The electro-optical device shown in FIGS. 1 and 2 serves for dynamically controlling the position of a radiation spot 1 relative to a substantially planar surface representing an information structure 2 of a moving information carrier 3, of which only a small part is shown. The information carrier may be, an optical audio disc or an optical video disc. The device comprises a frame 4 and a lens system 5 having an optical axis 6. The lens system forms the moving part of an objective which includes comprises a stationary lens 7 arranged in the frame 4. The part of the electro-optical device situated in the interior of the frame 4 may be identical to the stationary part of the electro-optical device disclosed in the Applicant' European Patent Application No. 0077581. As this part of the device is irrelevant to the present invention it will not be described in more detail; it is to be noted only that a semiconductor laser arranged in this part produces a light beam 8 which is concentrated into the light spot 1 by the lens system 5.

The lens system 5 is mounted in a lens mounting 9 which is pivotable to a limited extent relative to the frame 4 about a pivotal axis 10 which extends parallel to and is spaced from the optical axis 6 of the lens system. The lens mounting is also translatable to a limited extent along the optical axis 10. These two movements enable the radiation spot to follow the information structure 2 on the information carrier in two directions, namely, along the optical axis 6, for focusing the radiation spot on the information structure, and in arcuate directions about the pivotal axis 10 and consequently in a plane perpendicular to the optical axis, for following a track of the information structure with the radiation spot. The supporting means which enable said movements of the lens mounting to be performed comprise a bearing pin 11 whose axis forms the pivotal axis 10 and two annular bearings 12 which fit around the bearing pin and which are axially spaced from one another.

For translating the lens mounting 9 along the pivotal axis 10 there are provided first electromagnetically cooperating actuator means 13 in the form of a coil 13A arranged on the frame 4 and an annular permanent magnet 13B arranged on the lens mounting concentrically with the coil 13A. For the pivotal movement of the lens mounting about the pivotal axis there are provided second actuator means 14 comprising two coils 14A arranged on the frame 4 and permanent magnets 14B1 and 14B2 arranged on the lens mounting 9. Both the first and second actuator means are symmetrically located with respect to the pivotal axis 10.

The lens mounting 9 is substantially bar shaped in this embodiment with a maximum longitudinal dimension extending along a line which intersects the optical axis 6 of the lens system 5 and the pivotal axis 10. The lateral dimension is no greater than twice the diameter of the lens system 5. At a location on the opposite side of the pivotal axis 10 to the lens system 5 a counter mass 15 is arranged in an opening 16 in the lens mounting 9. The two parts of the lens mounting 9 which are situated on opposite sides of the pivotal axis 10 have substantially the same mass and mass distribution. By the choice of the material, dimensions and location of the countermass 15, the mass and the mass distribution of that part of the lens mounting which lies on the opposite side of the axis 10 to the lens system 5 can be influenced. The lens mounting shown in FIGS. 1 and 2 has a rectangular cross-section. Within the scope of the invention it is possible to select another shape for the lens mounting. For example, the shape of the lens mounting on one side of the pivotal axis may differ from its shape on the other side. It is not always necessary to use a countermass in the form of a separate part which is secured to the lens mounting. Instead the counter mass may be an integral part of the lens mounting.

A first end 11A of the bearing pin 11 is connected to the frame 4. The bearing pin extends through the lens mounting, so that the second end 11B of the pin projects from the lens mounting. The bearing pin consists of a thin flexible metal wire; for example, a silver steel wire. The lens mounting 9 is covered by a cover 17 which is secured to the frame 4 and which is formed with an apertual 18 in which the second end 11B of the bearing pin 11 fits so that the cover 17 functions as a support for the bearing pin 11. The cover also has an opening 19 for the passage of the light beam 8. For securing the cover 17 to the frame 4 there are provided three bolts 20 which pass through holes 21 of slightly larger diameter in flanges 22 of the cover and screw into screwthreaded bores 23 in the frame 4. The position of the end 11B of the bearing pin 11 can be adjusted in a direction transverse to the pivotal axis 10 by shifting the cover 17. This enables the position of the optical axis 6 of the lens system 5 to be influenced to some extent during assembly of the device in order to align it relative to the part of the optical device accommodated in the frame 4.

The two bearings 12 are annular ruby bearings, as frequently employed in clocks and precision instruments.

The second actuator means 14A and 14B are disposed near the ends of the lens mounting 9. As is shown in FIG. 1, the coils 14A have a square shape. The two corresponding permanent magnets 14B cooperate with two sides of the square coils 14A. These magnets are each magnetized in a direction perpendicular to the plane of the respective coil, the magnetic vector near one side of the magnets being opposite to that near the other side, because the direction of the current in the turns of one of the coils 14A is opposite to the direction of the current in the turns of the other coil. Thus, the two coils exert equal pivotal forces on the ends of the lens mounting 9. The first actuator means 13A and 13B are arranged between the ends of the lens mounting near the pivotal axis 10. The cylindrical coil 13A is wound on a coil former 24 which is connected to the frame 4 by suitable means, for example an adhesive. The permanent magnet 13B is axially magnetized and is arranged on an iron holder 25. Thus, the magnetic field of the permanent magnet is shielded to some extent and is slightly concentrated near the coil 13A. The holder 25 is also used for supporting the ruby bearings 12.

The coil leads of the coil 13A and of the two coils 14A are connected to pins 26 on a connecting plate 27 in the upper side of the frame 4. For the electrical connections of these coils and the electrical parts belonging to the part of the electro-optical device inside the frame 4 a multipole connector 28 is arranged on the frame.

The embodiment shown in FIG. 3 is very similar to that shown in FIGS. 1 and 2 in some respects. For example, the frame 29 is identical to the frame 4, with the omission of the coils 13A and 14A. The differences are limited to the upper portion of the part of the device shown in FIG. 3. The first and the second actuator means comprise first permanent-magnetic actuator means 30B and second permanent-magnetic actuator means 37B respectively, which form part of a lens mounting 31 with a lens system 32 and a countermass 33. The lens system has an optical axis 34 and is pivotable about and translatable along a pivotal axis 35 formed by the axis of a bearing pin 36. The first actuator means also comprise two actuator coils 30A and the second actuator means comprise an actuator coil 37A. The permanent magnet 30B is axially magnetized in the direction indicated by the arrow, with the symbols N and S for north polarity and south polarity respectively. The second permanent-magnetic actuator means 37B comprise two permanent magnets 37B and 37B2 which are magnetized in opposite directions transverse to the pivotal axis 35, again as indicated by the relevant arrows. The two coils 30A and the coil 37A are spaced coaxially from one another on a common coil former 38, which coil forms also functions as a cover for the lens mounting 31 and as support for the second end 36B of the bearing pin 36. By the use of two axially spaced coils 30A a coil arrangement is obtained which in conjunction with the axially magnetized permanent magnet 30B constitutes an actuator with a comparatively large stroke and a substantially linear characteristic. Both the first and second actuator means are symmetrically located with respect to the pivotal axis 35.

Figure 4:
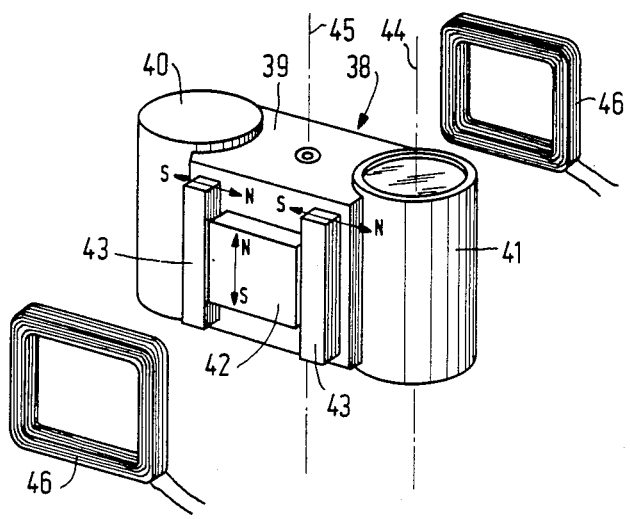

For simplicity FIG. 4 only shows those parts of a further embodiment of the invention which differ distinctly from those of the two embodiments described in the foregoing. The lens mounting 38 is pivotable about and translatable along an axis 45 and comprises an intermediate section 39 and a countermass 40 which is integral with this portion. The lens system 41 is mounted in a recessed end portion of the intermediate section 39 by means of an adhesive. The optical axis of the lens system is represented by the dot-dash line 44.

The first actuator means comprise axially magnetized permanent first magnets 42 mounted on the two long sides of the lens mounting. The drawing shows only one of the long sides, the other long side being identical, whilst the magnets mounted thereon are also identical. The second actuator means comprise second magnets 43 arranged one on each of two opposite sides of the first magnet 42 on each side of the lens mounting. All the magnets are secured to the intermediate section 39 by means of an adhesive.

The first and second actuator means both further comprise two coils 46. These coils are secured to the frame in, for example, the same way as the coils 14A, B in FIG. 1. The first magnets 42 are disposed within the projected inner peripherics of the coils, so that they can be subjected to axial forces. The second magnets 43 can be subjected to pivotal forces by the facing parts of the coils 46. By energizing the coils in phase or in phase opposition, respectively the axial forces will cancel each other and the pivotal forces will not cancel each other or, conversely, the axial force will not cancel each other but the pivotal forces will. By influencing the degree of phase opposition it is possible to influence the extent to which one type and the other type of forces are exerted.

Both the first and second actuator means are symmetrically located with respect to pivot axis 45.

What is claimed is:

1. An electro-optical device for controlling the position of a radiation spot in two directions relative to a substantially planar surface representing an information structure on a moving information carrier, which device comprises
    a frame;
    a lens system comprising at least one lens having an optical axis along which said radiation spot is focussed;
    a lens mounting to which the lens system is rigidly secured so that said optical axis is at least substantially perpendicular to said planar surface, said lens mounting being pivotable to a limited extent about and translatable to a limited extent along a pivotal axis therethrough which is parallel to and spaced from said optical axis, said lens mounting having a maximum longitudinal dimension extending along a line which intersects the optical and pivotal axes and a lateral dimension no greater than twice the diameter of the lens system, the two parts of the lens mounting which are situated on opposite sides of the pivotal axis along the longitudinal dimension having at least substantially the same mass and at least substantially the same mass distribution so that the lens mounting is substantially balanced both statically and dynamically;
    supporting means comprising a bearing pin whose axis forms the pivotal axis and at least one bearing in which the bearing pin fits;
    first electromagnetic actuator means for translating the lens mounting along the pivotal axis for focussing the radiation spot on the information structure; and
    second electromagnetic actuator means for pivoting the lens mounting about the pivotal axis to follow a track of the information structure.

2. An electro-optical device as claimed in claim 1, in which a first end of the bearing pin is connected to the frame, characterized in that
    the bearing pin extends through the lens mounting so that a second end of said bearing pin projects from the lens mounting,
    the bearing pin comprises a thin flexible metal wire,
    the second end of the bearing pin is connected to a support which is secured to the frame, and
    the position of at least one of the ends of the bearing pin is adjustable in a direction transverse to the pivotal axis.

3. An electro-optical device as claimed in claim 2, characterized in that the lens mounting comprises two annular ruby bearings for the bearing pin, which bearings are spaced from each other.

4. An electro-optical device as claimed in claim 1, characterized in that the lens mounting has a pair of opposed ends along the longitudinal dimension,
    the first actuator means being situated between the ends of the lens mounting near the pivotal axis,
    the second actuator means being situated near the ends of the lens mounting.

5. An electro-optical device as claimed in claim 1, characterized in that
    the first and the second actuator means respectively comprise first and second permanent-magnetic actuator means on the lens mounting and first and second actuator-coil means on the frame,
    the first and second permanent-magnetic actuator means are situated at least partly along the circumference of the lens mounting and are axially spaced from each other, and
    the actuator-coil means comprise a plurality of coaxial coils which are situated around the lens mounting so as to form an air gap between the coils and the permanent-magnetic actuator means, said coils being axially spaced from each other and arranged on a common coil former.

6. An electro-optical device as in claim 1 wherein the lens mounting has a pair of opposed sides parallel to the plane containing the pivotal axis and the optical axis,
    said first actuator means comprising a first permanent magnet on each said side which is axially magnetized parallel to the pivotal axis and having a center situated in a plane containing the pivotal axis and extending perpendicular to the plane containing the optical axis and the pivotal axis,
    said second actuator means comprising two second permanent magnets on each said side which are magnetized in a direction perpendicular to the plane containing the centers of the first permanent magnets and the pivotal axis and which are situated on opposite sides of the respective first permanent magnet at equal distances therefrom,
    said first and second actuator means further comprising two flat coils secured to the frame, one on each side of the lens mounting parallel to said plane containing the optical axis and the pivotal axis, each coil having two portions which extend at least substantially parallel to the pivotal axis, each first permanent magnet being situated within the projected inner periphery of a respective coil, each second permanent magnet facing one of said portions of a respective coil which extend at least substantially parallel to the pivotal axis.

7. An electro-optical device as in claim 1 wherein said first actuator means is symmetrically located with respect to said pivotal axis.

8. An electro-optical device as in claim 7 wherein said second actuator means is symmetrically located with respect to said pivotal axis.

9. An electro-optical device as in claim 1 wherein said second actuator means is symmetrically located with respect to said pivotal axis.

* * * * *